(No Model.)

W. McLAUGHLIN.
HANDLE FOR SHOVELS, FORKS, &c.

No. 499,141. Patented June 6, 1893.

WITNESSES
A. J. Schwartz
John Cullen

INVENTOR
William McLaughlin
by his Attorney
J. Fred. Reily.

UNITED STATES PATENT OFFICE.

WILLIAM McLAUGHLIN, OF SPRING VALLEY, ILLINOIS.

HANDLE FOR SHOVELS, FORKS, &c.

SPECIFICATION forming part of Letters Patent No. 499,141, dated June 6, 1893.

Application filed September 22, 1892. Serial No. 446,604. (No model.)

*To all whom it may concern:*

Be it known that I, WILLIAM MCLAUGHLIN, a citizen of the United States, residing at Spring Valley, in the county of Bureau and State of Illinois, have invented certain new and useful Improvements in Handles for Shovels, Forks, &c.; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention consists in certain new and valuable improvements in shovel-, spade-, and fork-handles, which greatly increase the ease and efficiency with which the tool can be used in practical work; and my invention will be hereinafter fully described and claimed.

Figure 1:
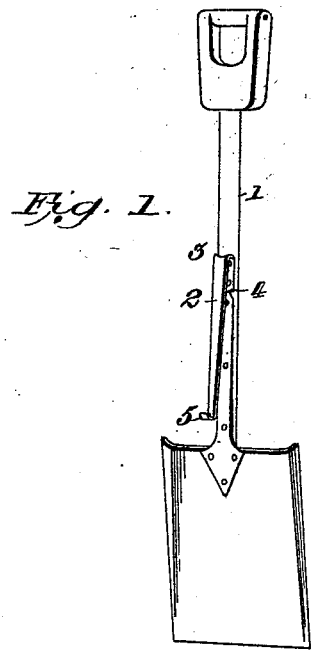
Figure 2:
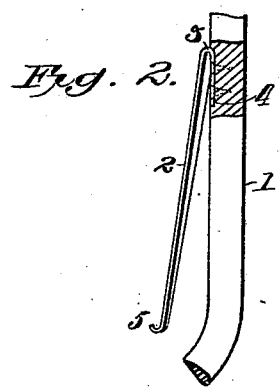
Figure 3:
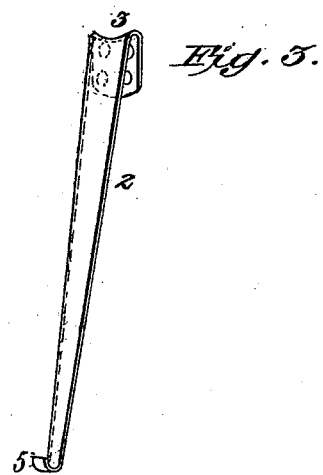

Referring to the accompanying drawings: Figure 1 is a perspective view of a shovel provided with my invention. Fig. 2 is a sectional view taken through the handle thereof. Fig. 3 illustrates the spring in detail, on an enlarged scale.

The same numerals of reference indicate corresponding parts in the several figures.

Referring to the several parts by their designating numerals: 1 indicates the handle of a shovel. The novel and peculiar spring 2 is formed of the best spring steel, and is preferably constructed about one-sixteenth ($\frac{1}{16}$) of an inch in thickness, and about eight inches or more in length; being one and three-fourths of an inch wide at its upper end, and tapering in width to its lower end, where it is only three-fourths or one-half inch. About one and one-half inches of the upper end of the spring is doubled back upon itself, as shown at 3; the entire spring being concave in cross-section, so as to conform to the curvature of the shovel or fork handle.

The back of the shovel or fork handle has a recess, 4, formed in it at a suitable distance from its upper end, in which the inwardly-bent end 3, or "saddle," of the spring fits, flush, being preferably secured by means of four screws passing through apertures in it into the handle. The upper end of the spring being thus secured to the handle, the body of the spring inclines slightly outward, as shown, so that its lower end stands normally about one and one-half inches from the handle. The lower end of the spring is formed with or terminates in an outward curve, forming a shallow hook, 5; the spring being so arranged that the hooked lower end fits up into the curve at the lower end of the handle when the spring is pressed in by the hand in use, as will be now described.

In operation, the forward hand of the workman slides along the back of the handle, as usual, finding little if any difference in the feel of the handle until his hand comes in contact with the hooked lower end of the spring. He then goes to lift the load, and in lifting it and throwing it from the shovel the spring shows its great advantage, for the load is lifted with a yielding springy feeling, and his forefinger fitting in the hooked lower end of the spring gives him a bracing power and command over the load which is impossible with the ordinary plain handle; while the greatest value of the device is experienced in delivering the load off the shovel, the "spring" of the device enabling the load to be thrown to a greater distance, with less effort on the part of the workman; the shovel springing or rebounding back into position ready for use again. The value of this feature is especially noticeable when the shovel is used in a trench, on railroad work, or in loading a wagon, where the workman has to throw the load above the level of his head; the spring enabling him to do this with greater ease and facility. In lifting the load or in throwing it from the shovel the workman of course opens the fingers of his left or lower hand, that is, releases their grip on the handle 1, in order to allow the spring to operate, as will be readily understood by reference to the drawings.

The spring weighs only four ounces, and is in no way cumbersome or inconvenient.

Having thus described my invention, what I claim, and desire to secure by Letters Patent, is—

1. A handle for shovels, forks, &c., having a spring secured at its upper end to the rear side of the handle said spring inclining outward toward its lower free end, and having formed at said lower free end an outwardly extending finger-piece or hook; substantially as and for the purpose set forth.

2. The combination, of the handle, and the spring, 2, concave in cross-section, having its upper end doubled back to form the part 3, tapering and inclining outward to its lower end, and formed at said end with the finger-piece or hook 5; substantially as set forth.

In testimony whereof I affix my signature in presence of two witnesses.

WILLIAM McLAUGHLIN.

Witnesses:
DAVID FARLEY,
GEO. L. HOFFMAN.